United States Patent

Moore

[11] Patent Number: 5,202,581
[45] Date of Patent: Apr. 13, 1993

[54] WINDSHIELD WIPER AND HEADLIGHT CONTROL CIRCUIT

[76] Inventor: John T. Moore, 102 Barden Dr., Havelock, N.C. 28532

[21] Appl. No.: 804,678

[22] Filed: Dec. 11, 1991

[51] Int. Cl.[5] ........................... B60Q 1/08; B60L 1/14
[52] U.S. Cl. ........................... 307/10.8; 318/DIG. 2; 315/82
[58] Field of Search .................. 318/443, 444, DIG. 2; 307/9.1, 10.1, 10.8; 180/333; 315/76, 80, 82, 83

[56] References Cited

U.S. PATENT DOCUMENTS 3,591,845  7/1971  Vanderpoel .
3,767,966 10/1973  Bell .

*Primary Examiner*—Bentsu Ro
*Attorney, Agent, or Firm*—Rhodes, Coats & Bennett

[57] ABSTRACT

The present invention entails a windshield wiper and headlight control circuit for automatically actuating the headlights of a vehicle in response to the windshield wipers being placed in an "on" mode. After the headlights have been so actuated, they remain in an "on" state irrespective of the "on/off" state of the windshield wipers. Moreover, the circuit of the present invention entails a latching circuit that is specifically designed to be compatible with all windshield wiper circuits irrespective of polarity. In particular, the latching circuit includes a reversible triac that can be incorporated into the windshield wiper and headlight control circuit irrespective of polarity.

6 Claims, 2 Drawing Sheets

WINDSHIELD WIPER AND HEADLIGHT CONTROL CIRCUIT

FIELD OF THE INVENTION

The present invention relates to windshield wiper and headlight control circuits that are integrated such that the headlights of the vehicle are automatically actuated by placing the windshield wipers in an "on" state.

BACKGROUND OF THE INVENTION

Visibility conditions are often poor when a vehicle driver is required to operate the vehicle's windshield wipers. Because of the typically poor visibility conditions when a vehicle's windshield wipers are being used, a vehicle's headlights should be turned on while the windshield wipers are being operated. To encourage this safe driving practice, many states have now enacted laws requiring that the headlights be turned on while a vehicle's windshield wipers are being operated.

There are numerous patents disclosing windshield wiper/headlight systems which turn a vehicle's headlights on in response to the operation of windshield wipers. U.S. Pat. No. 4,656,363 to Carter et al. is a representative patent which discloses a circuit for automatically operating the headlights in response to the operation of the windshield wipers. In addition, there are also patents which disclose systems that will place a vehicle's headlights in an "on" position in response to the closing of the windshield wiper switch and then maintain the vehicle's headlights in an "on" state independent of the operation of the windshield wipers. A system feature which maintains the headlights on independent of the operation of the windshield wipers prevents a driver from inadvertently turning off the headlights at night when the windshield wipers are turned off. U.S. Pat. No. 4,236,099 to Rosenblum and U.S. Pat. No. 4,956,562 to Benedict et al. disclose two different systems for maintaining the headlights on when the windshield wipers are turned off.

Prior art windshield wiper-headlight systems require complex circuitry to maintain the headlights on after the windshield wipers are turned off. Additional components and circuitry are also required to account for the polarity differences in windshield wiper systems of various types of vehicles. A simple and inexpensive windshield wiper/headlight system design is needed that will turn headlights on in response to the operation of the windshield wipers, and then maintain the headlights on once the windshield wipers are turned off. Such a headlight/windshield wiper system should be easily installed and retrofitted in cars, regardless of the polarity of the windshield wiper motor.

SUMMARY AND OBJECTS OF THE INVENTION

The present invention entails a windshield wiper/headlight system that turns on a vehicle's headlights in response to the operation of the windshield wipers and then maintains the headlights on independent of the operation of the windshield wipers. The circuitry of the present invention accounts for the polarity differences in windshield wipers of different vehicles without the use of unnecessary, complex circuitry.

The present invention system uses a latching circuit which includes a reversible two-way switch. A triac is used as the two-way switch and eliminates the need for the relatively large number of complex components that the prior art required to provide the latching function necessary to maintain the headlights on once the windshield wipers are turned off. In addition, the ability of the triac to act as a two-way switch enables the present system to conveniently account for polarity differences in windshield wiper motors. The present invention's reduction in the number of complex components and accounting of the polarity differences in windshield wiper motors results in a simpler system that is easily installed and retrofitted into vehicles.

It is therefore an object of the present invention to provide a windshield wiper/headlight system that is not dependent upon the polarity of the windshield wiper motor.

Another object of the present invention is to provide a system that can easily be installed or retrofitted on vehicles without requiring complex circuitry to account for the polarity differences in the windshield wiper motors of different vehicles.

Still a further object of the present invention is to provide a simplified windshield wiper/headlight circuit design that is reliable, but inexpensive.

Another object of the invention is to provide a windshield wiper/headlight control system which automatically turns on a vehicles headlight when the windshield wipers are turned on and maintains the headlights on independent of the position of the windshield wiper switch.

Other objects and advantages of the present invention will become apparent and obvious from a study of the following description and the accompanying drawings which are merely illustrative of such invention.

DETAILED DESCRIPTION OF THE INVENTION

Figure 1:
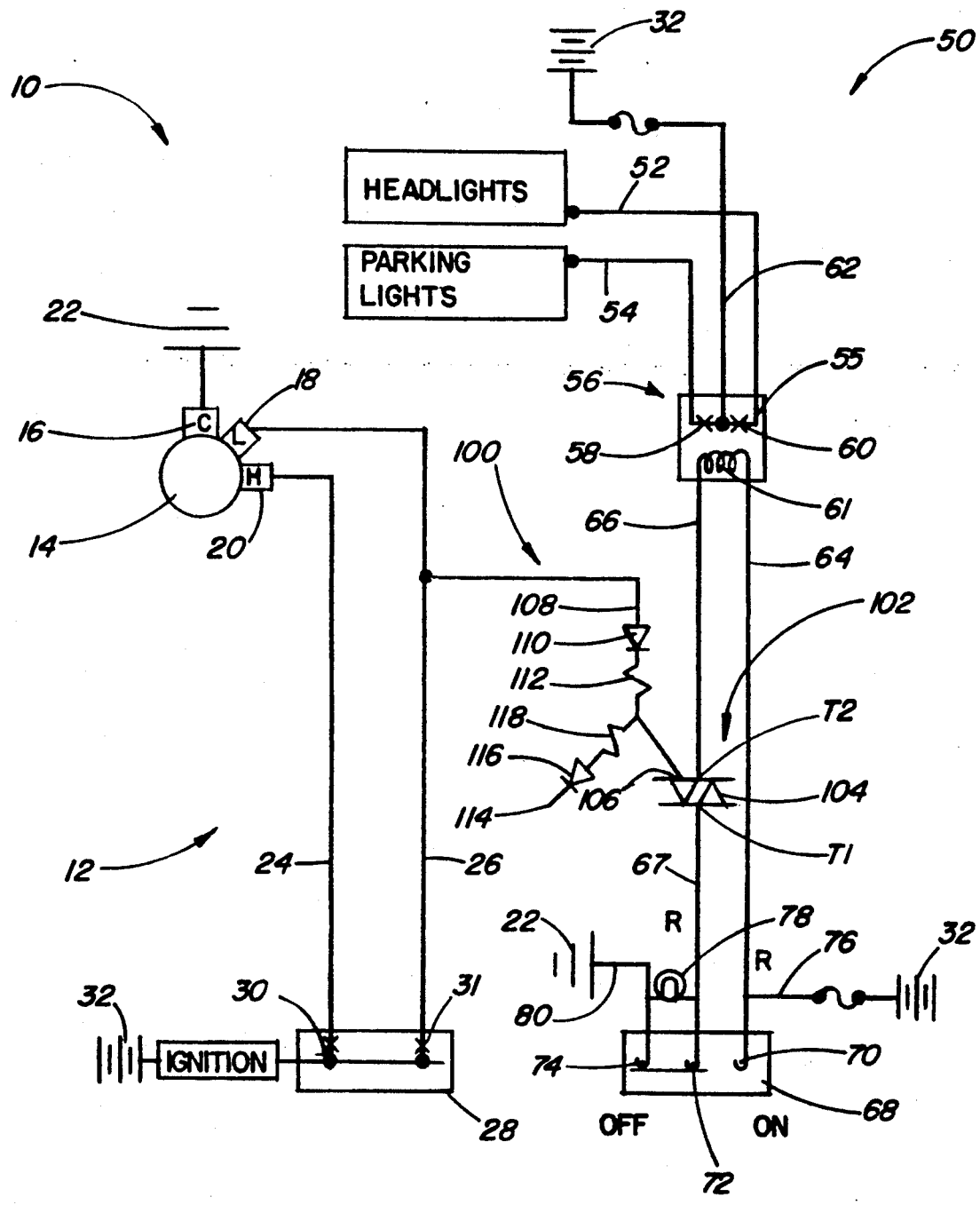
FIG. 1 is a schematic diagram of the windshield wiper/headlight control system of the present invention where the windshield wiper motor has a positive polarity.

With further reference to the drawings, the windshield wiper and headlight control system of the present invention is shown therein and indicated generally by the numeral 10. Forming a part of the windshield wiper and headlight control system 10 is a windshield wiper circuit indicated generally by the numeral 12. Connected within windshield wiper circuit 12 is a windshield wiper motor 14 having a common terminal 16, a low speed terminal 18 and a high speed terminal 20. In the case of the embodiment illustrated in FIG. 1, common terminal 16 is connected to ground 22.

Continuing to refer to the windshield wiper circuit 12, a pair of wires or leads 24 and 26 extend from the low and high speed terminals 18 and 20. Leads or wires 24 and 26 are connected to a switch 28 through a pair of terminals 30 and 31. Terminals 30 and 31 are connected to a battery 32 through switch 28.

Also forming a part of the windshield wiper headlight control system 10 of the present invention is a headlight circuit indicated generally by the numeral 50. It should be understood that the headlight circuit 50 could include a dimmer switch in series with the car's headlights. The dimmer switch is used to switch between the high beam and low beam of the car's headlights.

Forming a part of the headlight circuit 50 is a headlight lead wire 52 and a parking light lead wire 54. Lead wires 52 and 54 extend and are connected to a relay indicated generally by the numeral 56. As seen in the drawings, relay 56 includes a switch 55 that includes a pair of contacts 58 and 60. In addition, relay 56 includes a coil 61 that in conventional fashion is designed to actuate relay switch 55.

Also connected to switch 55 is a lead line 62 that is connected to battery 32. It is appreciated that battery 32 serves to direct power to both the headlights and parking light through lines 52 and 54 via relay switch 55.

Connected to the coil 61 is a first lead wire indicated by the numeral 64 and a second lead wire set including leads 66 and 67. Lead wires 64, 66, and 67 lead to and are connected to a two-positioned switch 68 having switch terminal 70, 72 and 74. As seen in the drawings, terminal 74 is connected to ground 22 through a lead line 80. Also, there is provided a battery lead line 76 that is connected between a battery 32 and lead line 64. Connected between lead line 80 and lead line 67 is a light signal 78. As shown in FIG. 1, the switch is in an "off" position. When the switch is moved to the right and extends between terminal 70 and 72, then the switch is in an "on" position. In the "on" position, it is appreciated that the light 78 would be actuated and would emit a light signal. When the switch is in the left hand position as viewed in FIG. 1, (the "off" position) then it is appreciated that the light 78 would be off.

Interconnected between the windshield wiper circuit 12 and the headlight circuit 50 is a latching circuit indicated generally by the numeral 100. The function of the latching circuit 100 is to actuate the headlight circuit 50 in response to the windshield wiper circuit 12 being actuated and then to maintain the headlight circuit 50 in a "on" stage irrespective of the "on/off" state of the windshield wiper circuit 12. To accomplish this, latching circuit 100 is provided with a triac which is indicated generally by the numeral 102. Triac 102 includes a two-way reversible switch with an actuating gate. In particular, the two-way reversible switch is referred to by numeral 104 and is connected between lines 66 and 67 at terminals $T_1$ and $T_2$. The actuating gate is referred to by the numeral 106. Extending from the actuating gate 106 is a positive voltage lead 108 that includes a diode 110 and a resistor 112. Diode 110 is particularly oriented in the positive voltage lead 108 so as to prevent a ground signal from being transmitted therethrough.

In addition, there is provided a ground voltage lead 114 that is connected to the same actuating gate 106. Ground voltage lead 114 includes a diode 116 that is particularly oriented so as to prevent a positive voltage signal from being transmitted through the lead 114 to the actuating gate 106. Finally, ground voltage lead 114 includes a resistor 118.

Effectively triac 102 will conduct current across two terminals irrespective of the polarity of the terminals. That is the switch 104 that forms a part of the triac 102 is effectively reversible such that it can conduct current between two leads irrespective of the polarity of the leads.

With reference to FIG. 1, it is seen that the switch 104 of the triac 102 is connected between line 66 and 67 of the headlight circuit 50. In this embodiment, it is seen that the $T_1$ terminal of switch 104 is connected to lead 67 while the $T_2$ terminal is connected to line 66. In this case, or with this particular orientation of the switch 104, the triac 102 calls for a positive voltage signal to be applied to gate 106 in order to actuate the triac 102 or the two-way switch 104. Thus, positive voltage lead 108 is connected to line 26 of the windshield wiper circuit 12. Because of the orientation of the positive voltage lead 108 with respect to the battery 32, it follows that a positive voltage signal will be directed from the battery 32 through the main switch 28 of the windshield wiper circuit 12 and on through positive voltage lead 108. This, of course, applies a positive voltage signal to the actuating gate 106, and upon applying the positive voltage signal to the actuating gate 106, then the triac 102 fires and effectively the switch portion 104 is closed and current can pass through lines 66 and 67 and consequently through the switch portion 104 of the triac 102. Once the triac 102 has been actuated by the windshield wiper circuit 12, then the vehicle headlights stay in an "on" state completely independent of the "on" or "off" state of the windshield wiper circuit 12. That is the nature of the triac 102. To turn the vehicle lights off, switch 68 must be shifted to the "on" position where terminal 70 and 72 are connected. This causes light 78 to be actuated and because of the relative resistances of the light 78 and the coil 61, there is insufficient current in the coil 61 to operate the same and to accordingly actuate the relay switch 55. Thus, by placing switch 68 in the "on" position, the lights are turned off.

As pointed out above, while the switch 68 is in the "on" position, the light 78 will be illuminated indicating to the vehicle operator that the switch needs to be placed in the "off" position before the headlight circuit will be actuated by the actuation of the windshield wiper circuit 12. Thus, in practice, once the vehicle operator turns the lights off by shifting switch 68 to the "on" position, he or she will then return the switch to the "off" position such that the headlight circuit 50 will be ready for future actuation by the windshield wiper circuit 12.

As noted above, the layout of the latching circuit as shown in FIG. 1 is particularly designed to accommodate a windshield wiper's circuit that produces a positive voltage signal for actuating the triac 102. It should be appreciated that if the two-way switch 104 were reversed in FIG. 1, then that alone would make the total system or circuitry inoperable. This is because there would be a positive voltage signal being directed to the actuating gate 106 and in this reverse configuration, the positive voltage signal would not be effective to fire and actuate the two-way switch 104.

The present invention is also designed to accommodate a vehicle where the windshield wiper circuit 12 is provided with a ground connection 22 which is connected to the windshield wiper switch 28 opposite the windshield wiper motor 14. In this case, the windshield wiper circuit 12 is oriented such that the voltage from battery 32 will be dropped across windshield wiper 14 such that only a small voltage (due to the resistance in line 26) will be placed on line 26. This small voltage will be referred to as a ground or negative voltage to distinguish this small voltage from the high battery voltage placed on line 26 when circuit 12 is oriented as shown in FIG. 1. Therefore, to apply the latching circuit 100 of the present invention to the embodiment shown in FIG. 2, the triac 102, or more particularly the two-way switch 104 of the triac 102, is reversed from the position shown in FIG. 1. Not only is the two-way switch 104 reversed, but the actuating signal directed from the windshield wiper circuit 12 is directed through the ground voltage lead 114. This is because in this particular orientation, the triac 102 or two-way switch 104 (in the design of FIG. 2) can only be actuated by a ground voltage signal. Consequently, it is imperative that the ground voltage lead 114 be utilized as shown in FIG. 2.

Figure 2:
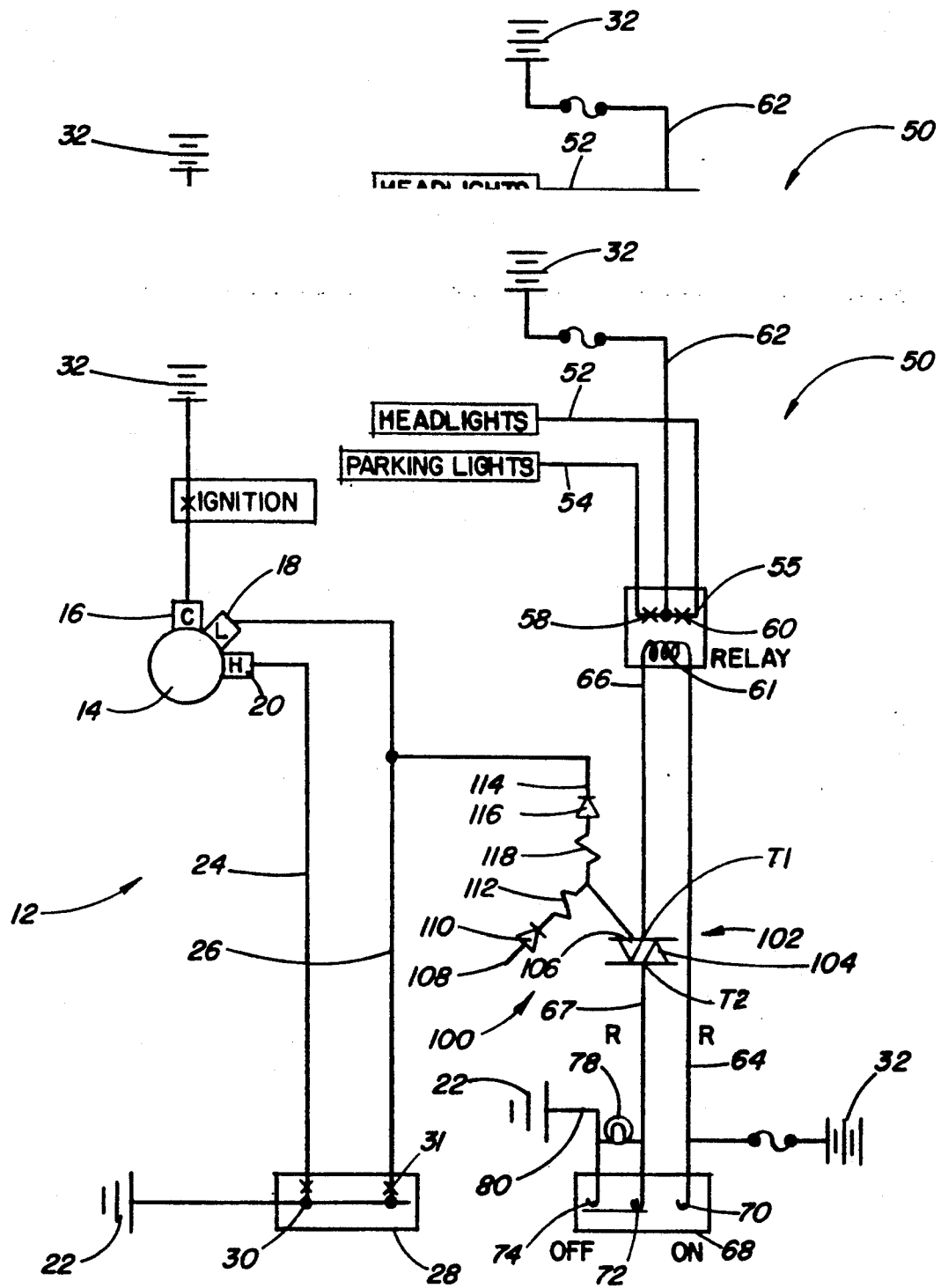
FIG. 2 is a schematic diagram of the present invention windshield wiper control system where the windshield wiper motor has a negative polarity.

A detailed description of FIG. 2 is not dealt with here in detail because it is essentially the same design as discussed and illustrated with respect to FIG. 1. except that the polarity of the windshield wiper's circuit 12 have been effectively reversed. In particular, as shown in FIG. 2, the wiper switch 28 is connected to ground 22 while the windshield wiper motor 14 is directly coupled to the battery 32.

To further illustrate the operation of the windshield wiper and headlight control system 10, truth tables corresponding to the preferred embodiments of the latching circuit 100 of the present invention are presented below:

TRUTH TABLES

I. WIPER MOTOR CONNECTED TO POSITIVE LEAD

| | Positive Lead | $T_2$ of Triac | $T_1$ of Triac | Lights Turned On* |
|---|---|---|---|---|
| 1. | + | + | − | Yes |
| 2. | − | + | − | No |
| 3. | Open Lead | + | − | No |
| 4. | + | − | + | No |

II. WIPER MOTOR CONNECTED TO NEGATIVE LEAD

| | Negative Lead | $T_2$ of Triac | $T_1$ of Triac | Lights Turned On* |
|---|---|---|---|---|
| 1. | − | − | + | Yes |
| 2. | + | − | + | No |
| 3. | Open Lead | − | + | No |
| 4. | − | + | − | No |

*Triac 102 and lights continue operating once activated regardless of the state of the positive lead 108 and the negative lead 114.

Truth table I shows under what condition the windshield wiper and headlight control system 10 will turn on the car's headlights when the positive lead 108 is used in conjunction with the windshield wiper circuit 12. As indicated by the first line of Truth Table I, when windshield wiper control system 10 is connected as shown in FIG. 1 a negative voltage from the ground 22 is placed on terminal $T_1$ of triac 102 and a positive voltage from battery 32 is placed on terminal $T_2$ of triac 102. The closing of windshield wiper switch 28 places a positive voltage on positive lead 108. As shown by the first line of the Truth Table I, under these conditions the car lights will be turned on. As noted by the asterisks in the truth tables, the triac 102 and car lights continue operating once activated regardless of the state of the positive lead 108 and the negative lead 104. The remaining examples of Truth Table I show that the headlights will not be operated when other signals are applied to positive lead 108 and terminals $T_1$ and $T_2$ of triac 102.

Truth table 2 shows under what condition the windshield wiper and headlight control system 10 will turn on the car lights when the negative lead 114 is used in conjunction with the windshield wiper circuit 12. The first line of Truth Table II shows how windshield wiper and control system 10 operates when it is connected as shown in FIG. 2 and windshield wiper switch 28 is closed. When system 10 is connected in this manner, a negative voltage from ground 22 is placed on terminal $T_2$ of triac 102 and a positive voltage from battery 32 is placed on terminal $T_1$ of triac 102. The closing of windshield wiper switch 28 places a negative voltage on negative lead 114. As shown by the first line of Truth Table II, under these conditions the car lights will be operated. The remaining examples of Truth Table II show that the car lights will not be operated when other signals are applied to negative lead 114 and terminals $T_1$ and $T_2$ of triac 102.

Tables I and II demonstrate how windshield wiper circuit 12 and latching circuit 100 must be connected in the windshield wiper and headlight control system 10 of the present invention to properly operate the headlights.

It is therefore appreciated that the present invention presents a windshield wiper and headlight control system wherein the latching circuit 100 includes a reversible triac 102 that can be utilized with windshield wipers circuits having different polarities. It is also appreciated that the windshield wiper headlight control system of the present invention is relatively simple, but is effective to actuate the headlights of the vehicle in response to the windshield wiper circuit being actuated and to maintain that headlight circuit is an "on" state irrespective of the "on/off" state of the windshield wiper circuit.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A windshield wiper headlight control system for automatically actuating the headlights of a vehicle in response to the windshield wipers being turned on and wherein the headlight control circuit is designed to accommodate windshield wipers circuits of different polarity, the control circuit comprising:
    (a) a windshield wiper circuit having a wiper switch and adapted to provide a light actuating signal in response to the windshield wiper circuit being actuated, the light actuating signal being either a positive voltage signal or a ground voltage signal depending on the polarity of the windshield wiper circuit;
    (b) a headlight circuit having a headlight switch; and
    (c) a latching circuit connected between the windshield wiper circuit and the headlight circuit for actuating the headlight circuit in response to the closing of the windshield wiper switch and maintaining the headlight circuit in an "on" stage independently of the "on-off" state of the windshield wiper circuit, and wherein the latching circuit is reversible and adapted to function and receive the light actuating signal, the latching circuit comprising:
        (1) an actuating gate;
        (2) a positive actuating lead connected to the actuating gate for transmitting a positive voltage signal from the windshield wiper circuit to the actuating gate and actuating the latching circuit, the positive actuating lead including means for prohibiting the transfer of a ground voltage signal from the windshield wiper circuit to the actuating gate;
        (3) a ground actuating lead connected to the actuating gate for transmitting a ground voltage signal from the windshield wiper circuit to the actuating gate and actuating the latching circuit, the ground actuating lead including means for prohibiting the transfer of a positive voltage signal from the windshield wiper circuit to the actuating gate; and (4) a reversible switch having first and second terminals connected in the latching circuit, and wherein the reversible switch is operative to conduct current in either of two orientations but wherein in each orientation the reversible switch can only be actuated in response to a single and different windshield wiper input signal, the positive or ground voltage signal, being directed to the actuating gate, thereby enabling the reversible switch to be actuated and thereby closed with either the positive voltage signal or the ground voltage signal, depending on the polarity of the windshield wiper motor, by selectively orienting the reversible switch of the latching circuit.

2. The system of claim 1 wherein the latching circuit includes a triac.

3. The system of claim 1 wherein both the positive and ground actuating leads include a diode that is selectively oriented so as to only allow the positive voltage signal to pass through the positive actuating lead and the ground voltage signal to pass through the ground actuating lead.

4. The system of claim 1 wherein the headlight circuit includes a headlight deactuation switch for deactuating the headlights after the same has been actuated by the windshield wiper circuit; and signal means for indicating that the deactuation switch has in fact been actuated.

5. The system of claim 4 wherein the latching circuit is only operative to actuate the headlights when the headlight deactuation switch is in the "off" position.

6. The system of claim 5 wherein the latching circuit is inoperative to actuate the headlight circuit when the headlight deactuation switch is in the "on" position.

* * * * *